(12) United States Patent
Scheffler et al.

(10) Patent No.: US 11,465,257 B2
(45) Date of Patent: Oct. 11, 2022

(54) GLASS POLISHING DEVICE

(71) Applicant: GLAS-WELD, SYSTEMS, INC., Bend, OR (US)

(72) Inventors: Dominik Scheffler, Bend, OR (US); Shiloh Spoo, Bend, OR (US); Efren Larranaga, Bend, OR (US)

(73) Assignee: GLAS-WELD SYSTEMS, INC., Bend, OR (US)

( * ) Notice: Subject to any disclaimer, the term of this patent is extended or adjusted under 35 U.S.C. 154(b) by 380 days.

(21) Appl. No.: 16/674,927

(22) Filed: Nov. 5, 2019

(65) Prior Publication Data

US 2020/0139509 A1   May 7, 2020

Related U.S. Application Data

(60) Provisional application No. 62/756,484, filed on Nov. 6, 2018.

(51) Int. Cl.
*B24B 23/00* (2006.01)
*B24B 57/02* (2006.01)
*B24B 23/02* (2006.01)

(52) U.S. Cl.
CPC .............. *B24B 57/02* (2013.01); *B24B 23/02* (2013.01)

(58) Field of Classification Search
CPC ................................. B24B 57/02; B24B 23/02
USPC ................................ 451/359, 363, 439, 450
See application file for complete search history.

(56) References Cited

U.S. PATENT DOCUMENTS

| | | | |
|---|---|---|---|
| 4,091,577 A * | 5/1978 | Ortiz | B24B 55/02 451/359 |
| 7,115,018 B1 * | 10/2006 | Syverson | B24B 23/02 451/6 |
| 7,144,312 B2 * | 12/2006 | Boyle | B24B 23/005 451/449 |
| 10,286,516 B2 * | 5/2019 | Ishikawa | B24B 23/02 |
| 2009/0221222 A1 * | 9/2009 | Lo | B24B 23/02 451/359 |

* cited by examiner

*Primary Examiner* — Joseph J Hail
*Assistant Examiner* — Shantese L McDonald
(74) *Attorney, Agent, or Firm* — Donn K. Harms

(57) ABSTRACT

A glass polishing device has a casing adapted for operative engagement with the exterior surface of a powered drill motor. The casing includes a handle extending from a second side opposite an opening in an opposite first side thereof from which a handle of the engaged drill motor projects. A triggerable fluid supply is coupled to the casing and projects fluid to a tool or a section of glass being resurfaced by the tool.

17 Claims, 7 Drawing Sheets

GLASS POLISHING DEVICE

This application claims priority to U.S. Provisional Patent Application Ser. No. 62/756,484, filed on Nov. 6, 2018, which is incorporated herein in its entirety by this reference thereto.

FIELD OF THE INVENTION

The present device relates to the repair of scratches and dings in glass. More particularly, it relates to a glass polishing device having a casing adapted with two or more components for assembly to a compressive engagement on the exterior surface of a hand held powered drive, such as an electric or pneumatic drill motor. So engaged, the device is configured to provide an improved constant flow of fluid to a polishing pad or other polishing component which is engaged and being rotated by the electric drive concurrent with an especially secure and steady ergonomic grip for users during use.

BACKGROUND OF THE INVENTION

Glass is a widely employed material in buildings and vehicles throughout the world. Glass panes are employed in buildings to provide light transmission into rooms while concurrently providing a shield from wind, weather, and the elements. Glass windshields provide drivers a clear view of the road while blocking wind and moisture from the driver. Glass tabletops and surfaces provide a clean and clear surface whereby underlying designs are protected.

A problem with most glass in buildings, vehicles, and on surfaces is the proclivity for glass to scratch or ding when impacted with a sharp instrument or when impacted by something at high speed. For example, on a high rise building which employs many levels there may be custom sized glass panes employed on each level and indeed in each window frame. Should one become scratched during shipment or installation, it is not easily replaced due to the custom configuration for the venue and window frame where it is to be installed.

Similar issues occur where custom glass surfaces cover underlying furniture or counters or other underlying surfaces which may have designs being protected by the glass. Further, vehicle windshields can become scratched from impacts with debris or the like at vehicle speeds.

The device herein provides a system for polishing defects in glass surfaces onsite to polish defects and scratches from glass surfaces and/or coatings thereon, without the need to remove the glass from its mount. The glass polishing component herein is configured in two half portions which are configured for engagement to each other in a compressive engagement against a complimentary contoured exterior surface of a hand held motor, such as those employed for drills or the like. It, thereby, provides the user with a triggered fluid supply delivered directly to the polishing component or pad being driven by the hand-held motor such as, for example, and in no way limiting, the MAKITA GV5010.

The forgoing examples of glass scratches and repairing such are intended to be illustrative and not exclusive, and they do not imply any limitations on the invention described and claimed herein. Various other limitations of the related art are known or will become apparent to those skilled in the art upon a reading and understanding of the specification below and the accompanying drawings.

SUMMARY OF THE INVENTION

The device herein provides an easily engaged casing formed in a plurality of engageable components to compressibly engage the exterior of a hand held drive such as an electric or pneumatic motor or electric drill type motor. While a larger plurality of components may be formed for assembly, in a current preferred mode of the device, a first half and a second half are compressibly engageable upon an underlying hand held electric or pneumatic motor device such as a drill motor.

When the plurality of casing components is two, each of the interior surfaces of both the first and the second half of the casing, are configured to be substantially complementary in shape, contour, and dimension, to the exterior surface of the housing of the hand held electric or pneumatic motor to which the casing is operatively engaged. This compressive engagement is achieved by fasteners connecting the first half of the casing with the second half of the casing once both are mated to their respective positions on the housing of a hand held electric motor.

So engaged, the casing formed by a plurality of casing components such as a first half and a second half, is configured to communicate a fluid such as water or other fluids employed in the polishing of glass, from a pressurized fluid supply to a polishing tool or pad operatively connected to the electric motor so that it will spin. A trigger on a rear facing surface of an ergonomic handle of the engaged casing is located adjacent a raised portion of the formed casing. This is especially preferred as the raised portion provides an ergonomic handle and gripping point for one hand of the user, on an opposite side of the handle of the engaged hand held motor. This positioning provides better stability when held and used. Further, as shown herein, the edge and/or axis of the formed handle angles downward from the rear of the drill motor toward the rotating end. This allows the user to grip the formed handle and maintain their elbow at or below the level of the rotating end and tool during use, for a more comfortable use as well as a more stable use allowed by the angle of the formed handle.

Further, by positioning of the fluid trigger on a rearward facing surface of the raised portion providing the handle for gripping by one hand of the user, they may easily trigger fluid flow and cease fluid flow during a repair, without removing either hand concurrently holding the device thereby enhancing and maintaining stability during use.

Stable handling of the device herein is particularly preferred. This is because a tilting of the casing and underlying electric or pneumatic motor off of a substantially perpendicular axis, relative to the repair being attempted on glass, can cause damage to the glass rather than repairing it. As such, by positioning a secondary handle or gripping portion of the assembled casing, opposite to and in the same plane as the handle of the engaged electric motor, even pressure can be more easily applied by the user on both of the two sides of the axis of the drive powering the polishing pad engaged to rotate using the power of the electric motor. Further, the angle of the formed handle allows the user to securely grip around the outside circumference with their hand at an angle allowing them to lower the elbow of that hand during use.

With respect to the above description, before explaining at least one preferred embodiment of the herein disclosed hand motor engageable glass polishing invention in detail, it is to be understood that the invention is not limited in its application to the details of construction and to the arrangement of the components in the following description or illustrated in the drawings. The glass polishing invention herein described and shown is capable of other embodiments and of being practiced and carried out in various ways which will be obvious to those skilled in the art. Also, it is to be understood that the phraseology and terminology employed herein are for the purpose of description and should not be regarded as limiting.

As such, those skilled in the art will appreciate that the conception upon which this disclosure is based may readily be utilized as a basis for designing of other glass polishing devices adapted for engagement to hand-held electric motors, and for carrying out the several purposes of the present disclosed device. It is important, therefore, that the claims be regarded as including such equivalent construction and methodology insofar as they do not depart from the spirit and scope of the present invention.

As used in the claims to describe the various inventive aspects and embodiments, "comprising" means including, but not limited to, whatever follows the word "comprising". Thus, use of the term "comprising" indicates that the listed elements are required or mandatory, but that other elements are optional and may or may not be present. By "consisting of" is meant including, and limited to, whatever follows the phrase "consisting of". Thus, the phrase "consisting of" indicates that the listed elements are required or mandatory, and that no other elements may be present. By "consisting essentially of" is meant including any elements listed after the phrase, and limited to other elements that do not interfere with or contribute to the activity or action specified in the disclosure for the listed elements. Thus, the phrase "consisting essentially of" indicates that the listed elements are required or mandatory, but that other elements are optional and may or may not be present depending upon whether or not they affect the activity or action of the listed elements. The term "substantially" when employed herein, means plus or minus twenty percent unless otherwise designated in range.

It is an object of the present invention to provide a glass polishing device formed in a plurality of housing components adapted for a compressive engagement upon the exterior housing of a hand held electric or pneumatic motor such as a hand held drill or sander or the like.

It is an additional object of this invention to provide such a glass polishing device which, once engaged to a housing of a hand held electric motor, positions a projecting grip for a second hand of the user in the same plane as the handle of the underlying electric motor, and at an angle allowing a lowered elbow on the gripping hand, which also positions a fluid trigger adjacent that projecting grip thereby allowing the user to maintain a firm grip on both sides of the device during use and during concurrent actuation that triggers a fluid supply.

These and other objects, features, and advantages of the present glass polishing device, as well as the advantages thereof over existing prior art, which will become apparent from the description to follow, are accomplished by the improvements described in this specification and hereinafter described in the following detailed description which fully discloses the invention, but should not be considered as placing limitations thereon.

BRIEF DESCRIPTION OF DRAWING FIGURES

The accompanying drawings, which are incorporated herein and form a part of the specification, illustrate some, but not the only or exclusive examples of embodiments and/or features of the disclosed hand held electric motor-engageable glass polishing device. It is intended that the embodiments and figures disclosed herein are to be considered illustrative of the invention herein, rather than limiting in any fashion.

Figure 7:
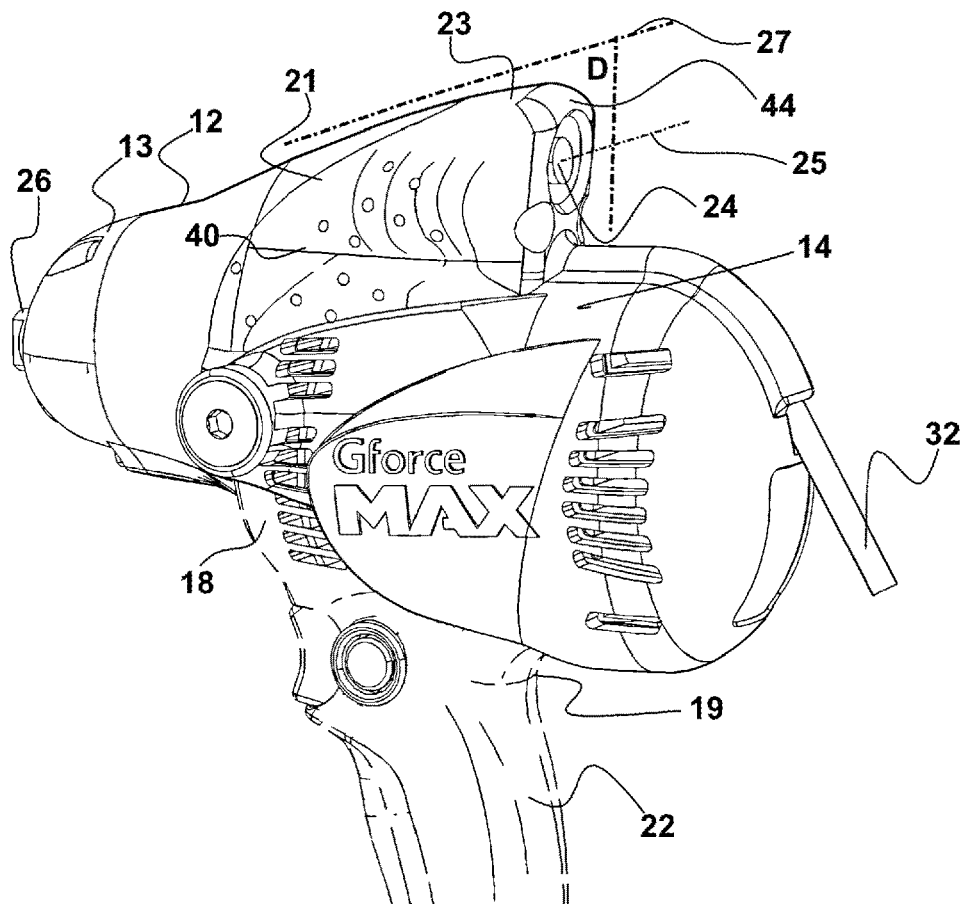

FIG. 7 as a rear perspective view of the device showing the projecting portion forming a handle having an axis allowing the user to grip the handle with their elbow positioned even with or below the rotating components in a more comfortable and controllable grip.

Figure 8:
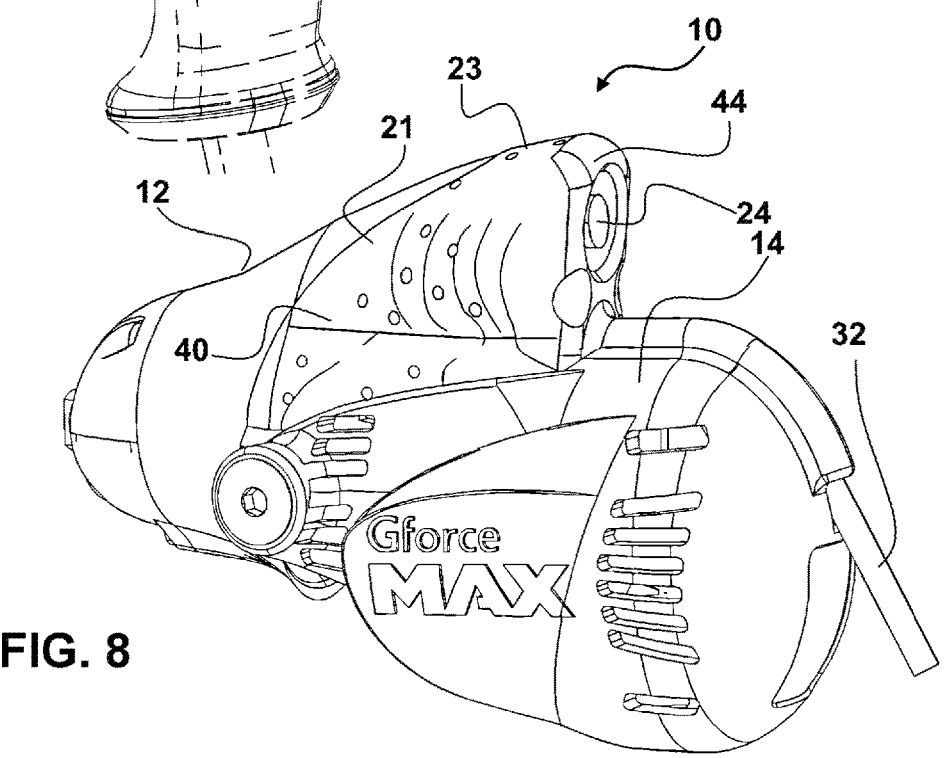

FIG. 8 shows the device assembled but without the drill motor operatively engaged.

DETAILED DESCRIPTION OF THE INVENTION

In this description, the directional prepositions of up, upwardly, down, downwardly, front, back, top, upper, bottom, lower, left, right and other such terms refer to the device as it is oriented and appears in the drawings and are used for convenience only and such are not intended to be limiting or to imply that the device has to be used or positioned in any particular orientation.

Figure 1:
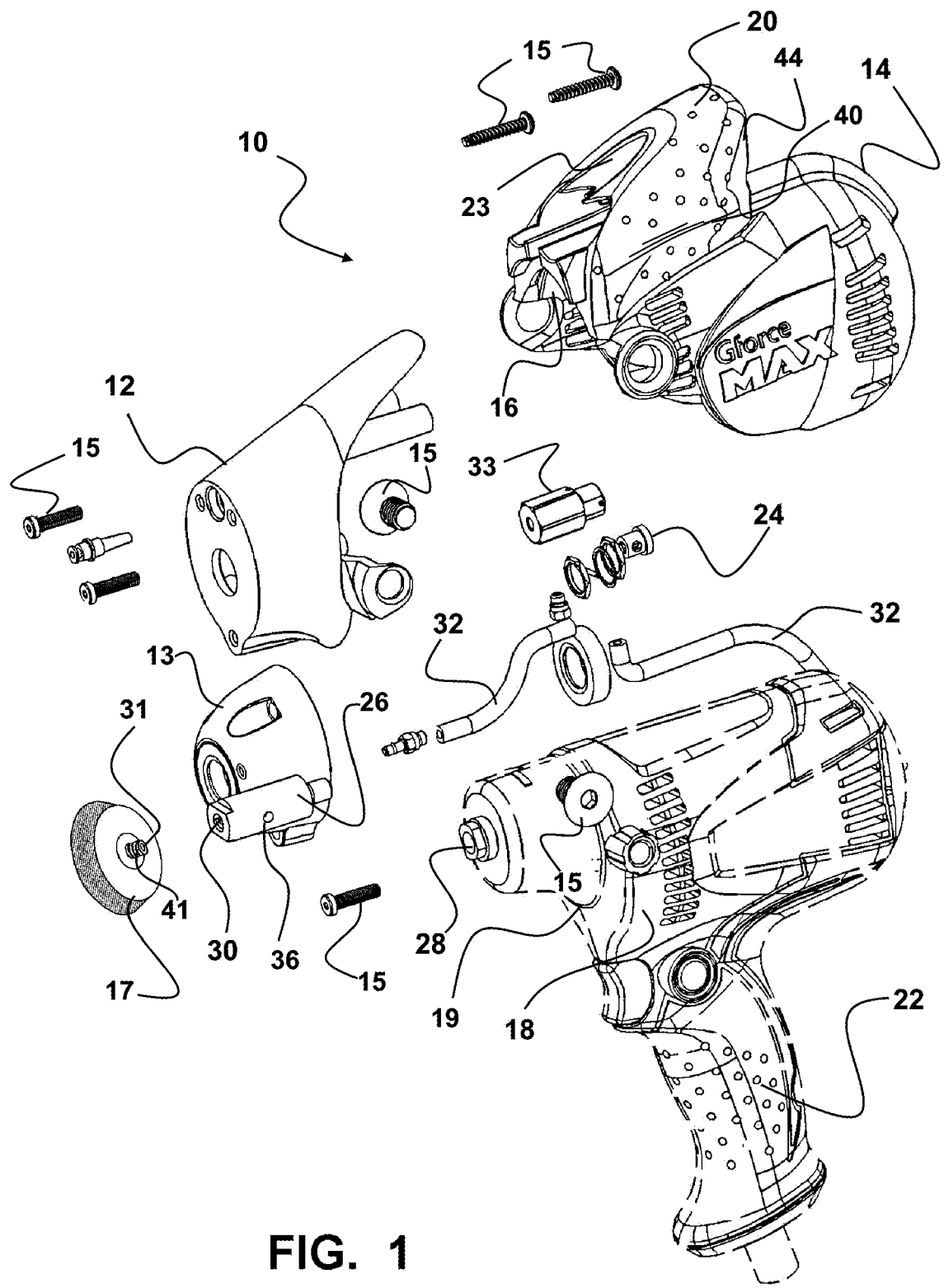
FIG. 1 depicts an exploded view of the device having a triggered fluid supply running within a plurality of housing components such as a first half and second half of the casing of the device, which each have interior surfaces and dimensions complimentary to an exterior surface of a casing of a hand held electric or pneumatic motor employed herewith.

Now referring to drawings in FIGS. 1-8, wherein similar components are identified by like reference numerals, there is seen in FIG. 1, an exploded view of the device 10 showing a casing 11 formed from a plurality of casing components and having an interior surface 16 configured for a contacting engagement against an exterior housing 18 of a drill motor 19 or the like, in operative engagement to the drill motor 19.

By operative engagement is meant that the interior surface 16 of the casing 11 is in contact with the exterior housing 18 of the drill motor 19 with a handle 22 of the drill motor 19 projecting from a first side of the casing 11 in such an engagement. By the term drill motor is meant any electric or pneumatic powered hand held motor which is triggerable to powered rotation, and has a handle for holding the drill motor during use.

While more than two components may be used to form the casing 11 of the device 10 herein, currently the primary components forming the casing 11 are assembled from a first half casing 12 and a second half casing 14. The interior surfaces 16 of each of the first half casing 12 and second half casing 14 and the formed casing 11 from the two are respectively configured to be substantially complimentary in both shape and dimension to the exterior housing 18 of a hand held electric or pneumatic or other powered drill motor 19 employed herein, to which they are adapted to engage.

This contacting engagement of complimentary shaped and contoured surfaces of the interior 16 of the formed casing 11 and the exterior housing 18, is preferred for all modes of the device 10 to achieve the operative engagement with a drill motor 19. This is because such a contacting engagement of the complimentary curved and contoured interior surface 16 against the exterior housing 18 holds the casing 11 securely fixed in place and will not allow the drill motor 19 to move during use relative to the operatively engaged surrounding casing 11.

As shown in a preferred mode herein, the first half casing 12 forms a contacting engagement with the drill motor 19 in combination with the second half casing 14, and the two are held engaged to each other by fasteners 15 adapted to the task. Other fasteners 15 may be employed to additionally secure the formed casing 11 to the drill motor 19 if such is desired.

The casing 11 has an interior surface 16 which is complementary in shape and contour to the exterior housing 18 surface of the chosen hand held electric or pneumatic drill motor 19 to which the formed casing 11 of the device 10 herein is adapted to operatively engage. Such a complimentary configuration and contact of the curves and contours of the interior surface 16 against the exterior housing 18, provides a solid non flexing combination of casing 11 and hand held powered drill motor 19 during use, with the drill motor handle 22 projecting from an opening 39 formed in the first side of the formed casing 11.

In all modes of the device 10, no matter the number in the plurality of casing components, a projecting portion 20 on a second side of the casing 11, defines a secondary handle 21 for gripping by a user and is preferably formed as part of one casing component such as the second half casing 14 but may include portions of both. This secondary handle 21 projecting from the second side of the casing 11, which is opposite the first side from which the drill motor handle 22 projects, can be seen in this and other figures herein such as FIG. 5. This secondary handle 21 is ergonomically curved about its curved surface 38 for easy gripping by the palm and fingers of either hand a user.

Figure 5:
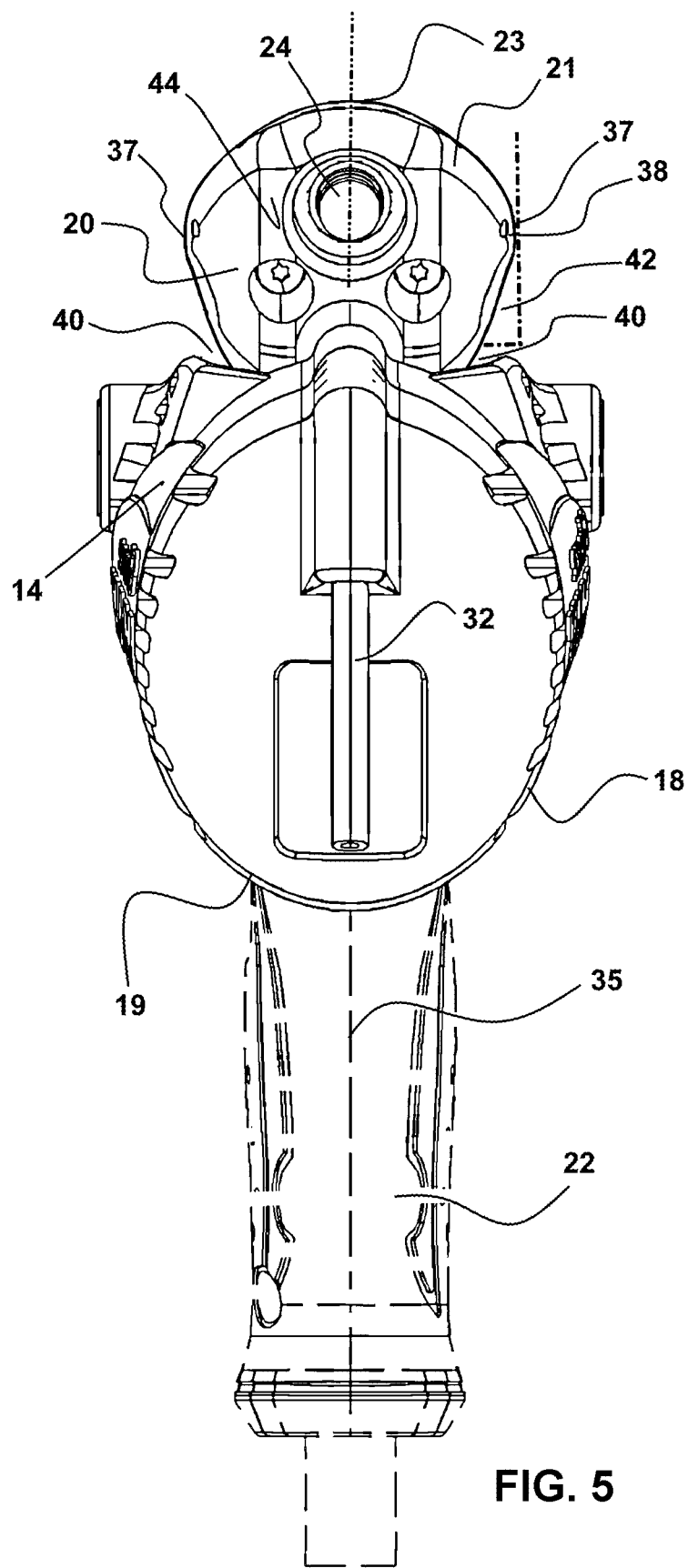
FIG. 5 shows a rear view of the device herein as in FIGS. 1-3 in a view depicting the ergonomically shaped projecting portion extending from the engaged plurality of casing components and also shows the recessed areas at the intersection with the casing and the downward slant of the formed handle axis, such as shown in FIGS. 1-2 and 6-8 allowing for an ergonomic grip by a user.

Also shown in FIG. 1 and for example in FIG. 5, the secondary handle 21, defined by the curved exterior 38 of the projecting portion 20, preferably extends substantially in the same plane as the handle 22 of the hand held pneumatic or electric drill motor 19, which projects from an opening 39 on the first side of the engaged casing 11 of the device 10 herein when engaged to the drill motor 19. Thus, the handle 22 will extend from a first side of the operatively engaged casing 11 along the handle axis 35, and the secondary handle 21 will extend from a second side of the casing 11 opposite the handle 22 extending from the first side, substantially in the same plane as the drill motor handle 22.

Figure 6:
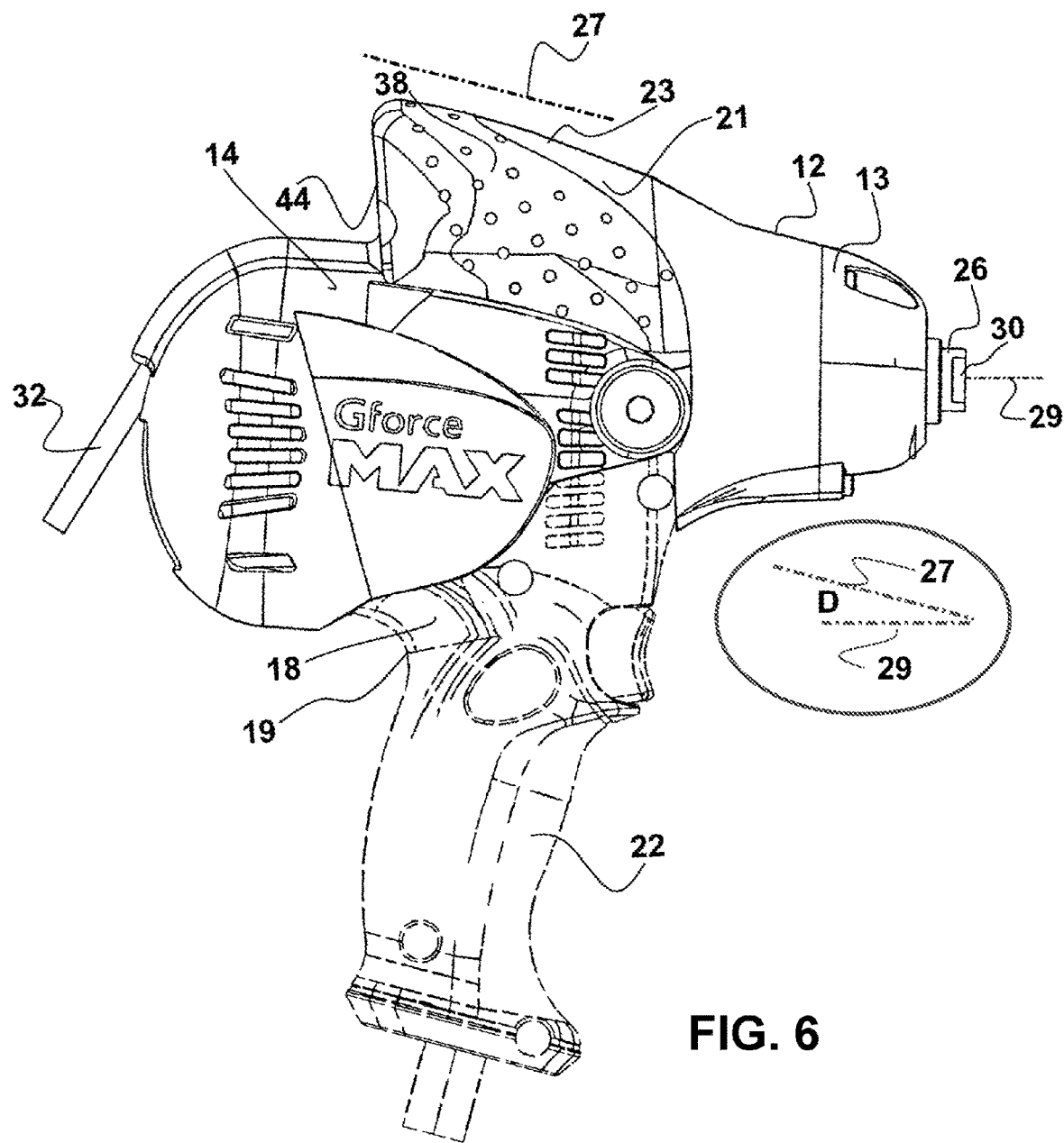
FIG. 6 shows a side view of the device herein operatively engaged with a drill motor and showing the downward angle of the exterior surface and axis of the handle formed by the extending portion which allows users to comfortably grip the device with either hand in a manner keeping the elbow on the gripping hand of the user, in a downward position.

By substantially in the same plane is meant that as shown in FIG. 6, the center line of the secondary handle 21 is aligned with the drill motor handle axis 35 or within 20 degrees thereof. Positioning the secondary handle 21 substantially in the same plane as the handle 22 with the center area of the top edge 23 of the secondary handle 21 substantially aligned with the handle axis 35 is preferred. This is because it allows the device 10 during use, to be held equally balanced with the user holding the secondary handle 21 with either a left or right hand. A tilt of the secondary handle 21 off center with the drill handle axis 35, would move the center area of the top edge 23 out of alignment and tilting to one side, which would change the way it has to be held depending on which side the user is on.

This configuration of aligned handle 22 and ergonomic secondary handle 21 defined by the projecting portion 20, as noted, has been found in experimentation to allow the user to hold the device 10, formed by the operatively engaged casing 11 and drill motor 19, in a fashion helping the user align the polishing pad 17 or other tool engaged to the rotating connector 26, which is coupled to and powered by the rotating drill shaft 28 of the drill motor 19, to the axis 29 of the drill motor thereby positioning it aligned and substantially perpendicular to the defect on the glass being repaired. By substantially perpendicular is meant plus or minus twenty degrees.

While a secondary handle running normal to the axis 29 of the powered drill motor 19 and to the handle 22, was originally used, experimentation found that providing an ergonomic secondary handle 21 defined by the projecting portion 22, substantially aligned with the axis of the handle 22 of the hand held drill motor 19, yielded significantly better repair results by providing a more steady grip enabling a better positioning of the buffing or polishing pad 17 to a position substantially perpendicular to the glass being repaired, which is important to prevent causing damage during the repair.

While a tool in the form of a polishing pad 17 is shown, other tools may be employed with the device 10 herein. All such tools, as with the polishing pad 17, will have a connector thereon configured to removably engage on or with the rotating connector 26 herein which is coupled to the powered shaft 28 of the drill motor 19 when the casing 11 is operatively engaged thereto. Such a connector would be adapted to removably engage a mating connector upon the rotating connector 26, such as threads as depicted in FIG. 1 on the connector 26.

Figure 3:
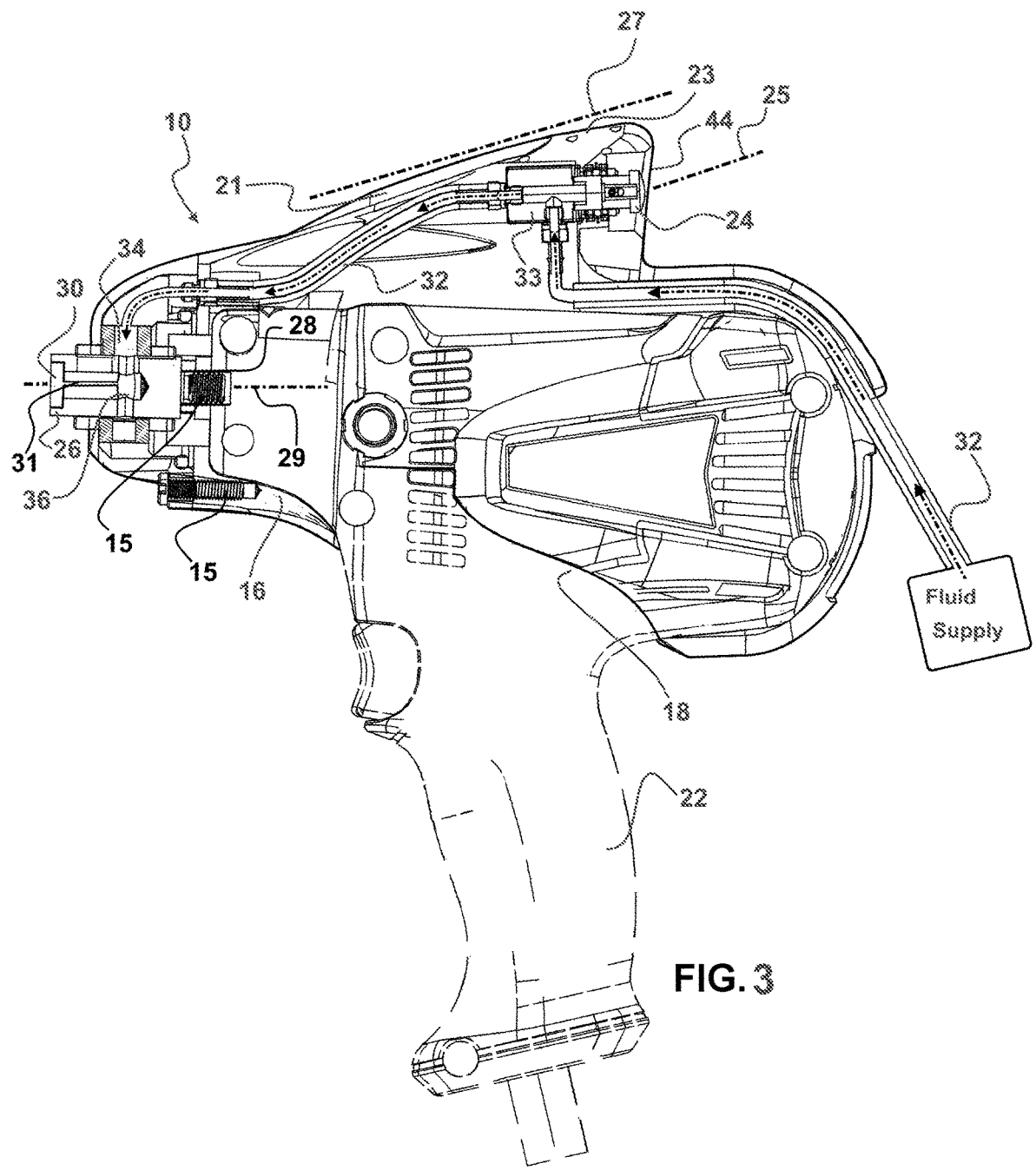
FIG. 3 depicts a sectional side view of the engaged device of FIG. 2 showing a fluid conduit configured to deliver fluid from a pressurized fluid supply when a trigger, positioned to be actuable from a rear surface of the projection, allows a user gripping a secondary handle to trigger the fluid flow which is delivered through the device to a polishing component.

Additionally, as shown in FIGS. 1, 3, and highlighted in FIG. 6, forming the projecting portion and secondary handle 21 at an angle "D" at least along an angle line 27 followed by a top edge 23 of the exterior curved surface 38 of the secondary handle 21, such that it slants downward at an angle "D", (FIG. 6). This slant runs from a high point elevated above the second end of the casing 11 at a first end of the handle at the rear wall 44, to a lowest point elevated above the second side of the casing 11 at a second end of the secondary handle 21 closer to the rotating connector 26 of the drill motor 19.

This angle or incline, depending on the viewpoint, of the secondary handle 21 is preferred in all modes of the device 10. This angle "D" of the formed secondary handle 21, such as shown following line 27 adjacent the top edge 23, was unexpectedly found to allow the user to grip the secondary handle 21 with their wrist turned or rotated in a fashion which locates the elbow of the user, level with or below, the level of the rotating connector 26 and engaged tool or pad 17, on glass being surfaced. Such a positioning of the elbow enabled by the handle angle "D" along slanted line 27, followed by the exterior surface 38 at a central area or a top edge 23 of the secondary handle 21, was found in experimentation to provide the user with significantly more control during polishing as well as comfort.

It was determined the enhanced stability and comfort of this angled secondary handle 21 was partly provided by enabling a user to maintain the drill motor axis 29 (FIG. 6), which runs through the drive shaft and the rotating connector 26, aligned with the glass surface area being polished.

While the device 10, can be formed with the top edge 23 of the secondary handle 21 running substantially parallel to the axis 29 of the drill motor 19, and the device 10 will still perform glass repairs better than the prior art, it was found with such a parallel configuration, that the user had to continuously maintain the elbow on their arm gripping the secondary handle 21, at a much higher elevation. This caused user discomfort over time and significantly reduced stability during use, especially over the time to perform a number of repairs, thereby reducing the ability of the user to maintain a substantially perpendicular positioning of the axis 29 of the drill motor 19 during use.

As such, the curved surface 38 of the secondary handle 21 following the angle "D" along the downward line 27 followed by a central area of the top edge 23 of the secondary handle 21, as shown in for example, FIG. 3 and enlarged in FIG. 6, is particularly preferred. This angle "D" is best defined as relative to the intersection of the downward line 27 with the drill motor axis 29 running along the drive shaft 28 thereof and through the axis of the rotating connector 26, as best shown in the enlarged angle depiction in FIG. 6. Although called a downward angle for convenience, it could also be defined as an inclining angle from the intersection of line 27 with the motor axis 29.

Additionally preferred is the positioning of the trigger 24 to initiate fluid flow to the fluid aperture 30, on a rear wall 44 or rearward facing surface of the secondary handle 21 defined by the projecting portion 20. Such a positioning was found to enable the user to better maintain this firm and steady grip of fingers wrapped around the secondary handle 21, while concurrently actuating the trigger 24, when needed, to activate the flow of the fluid supply through the fluid conduits 32 as needed. The downward angle noted above of the secondary handle 21, better positioned the thumb of the user gripping it, to easily depress the trigger 24 while gripping the secondary handle 21. Without the downward angle, the thumb of the user is located closer to and liable to encounter the exterior of the casing 11, and a constant repositioning was required.

Shown in FIGS. 2, 5, and 7-8 is the device 10 from differing angles in operative engagement upon the exterior surface 18 of the exterior of the housing 18 of the hand held electric or pneumatic motor 19. Such is achieved by connecting the first half casing 12 to the second half casing 14 using screws or other fasteners 15 to achieve the contact of the interior surfaces 16 of the formed casing 11 with the exterior housing 18 of the drill motor 19.

Figure 2:
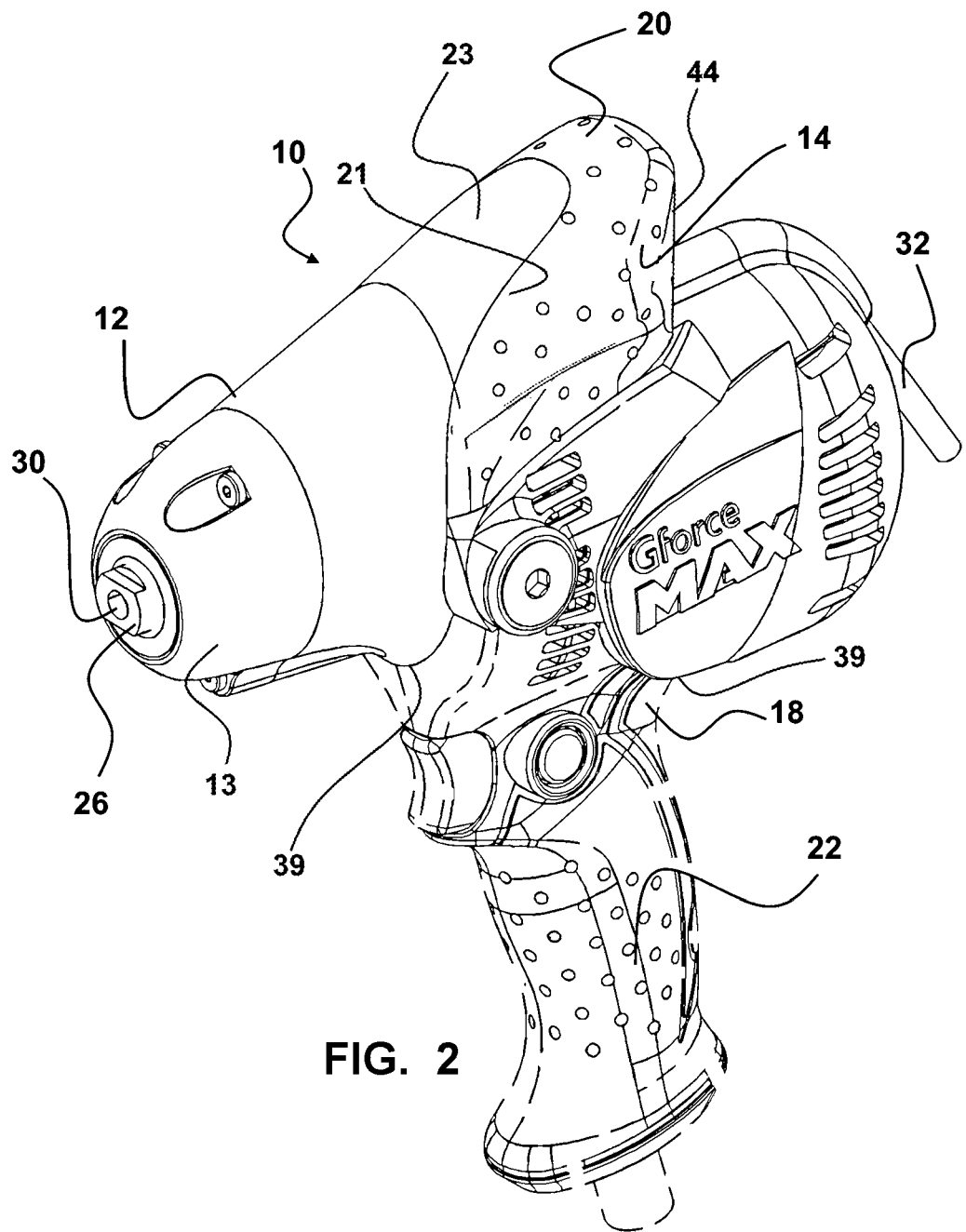
FIG. 2 depicts the device of claim 1 in operative engagement in a connection upon the exterior surface of the housing of the hand held electric or pneumatic motor and showing a projection or raised curved grip, directly opposite and in the same plane as the handle of the hand held motor.

As can be seen in FIGS. 1-3, the rotating connector 26 is rotationally positioned within a sealed cavity 34 surrounding it. This sealed cavity 34 may be operatively located within an interior cavity of the formed casing 11, and an engaged portion of the first half casing 12, such as within an end cap 13 portion of the first half casing 12.

A first end of this rotating connector 26 is connected to the powered shaft 28 of the hand held motor 19 during operative engagement of the casing 11, on the drill motor 19, and may have a fluid aperture 30 therein. This fluid aperture 30 communicates fluid received from the fluid conduit 32 onto the surface to be polished, preferably by fluid communication on or directly to a polishing pad 17 during use. Such a direct fluid communication may be through a channel 31 in the mounting shaft 41 for the polishing pad 17 holder or by spraying it onto the back of the polishing pad 17 when it is rotationally engaged to the rotating connector 26. Such fluid is only communicated when the trigger 24 (FIG. 3) is actuated by a user.

Thus, as shown in FIGS. 1-3, an actuable fluid pathway is provided with the device 10. This fluid pathway is defined by and runs from a fluid supply connected to one end of a fluid conduit 32, through the fluid conduit 32 and through a valve 33 which has the trigger 24 for valve actuation, and then to a sealed cavity 34 surrounding the rotating connector 26. From this sealed cavity 34 the fluid flows through the opening 36 in the rotating connector 26 and through a passage to exit at the fluid aperture 30. From the fluid aperture 30 the fluid in this fluid pathway can be directly or indirectly communicated to the tool or the polishing pad 17 being employed for a repair. The fluid flows through the fluid pathway to the repair tool or polishing pad 17, only when the trigger 24 is actuated to open the valve 33.

In FIG. 3 is shown a side view of the operatively engaged casing 11 of the engaged device 10 of FIG. 2 which also depicts the fluid conduit 32 configured to deliver fluid from a pressurized fluid supply when the trigger 24 positioned to be actuated by a thumb of a user from its position on a rear wall 44 of the secondary handle 21. As noted, with the user gripping the secondary handle 21 curved surface 38 exterior with their fingers, they can easily and concurrently actuate the trigger 24 to open the valve 33. This allows fluid from a pressurized supply to travel along the fluid pathway through the fluid conduit 32 to a sealed cavity 34 within the first half casing 12 which surrounds a the opening 36 whereafter the fluid exits the fluid aperture 30 of the rotating opening 36. This allows fluid to travel through the fluid pathway and to exit the fluid aperture 30 supplying fluid to an engaged polishing component, tool, or pad 17 directly or to otherwise communicate to the glass surface area being repaired such as with a spray nozzle.

Figure 4:
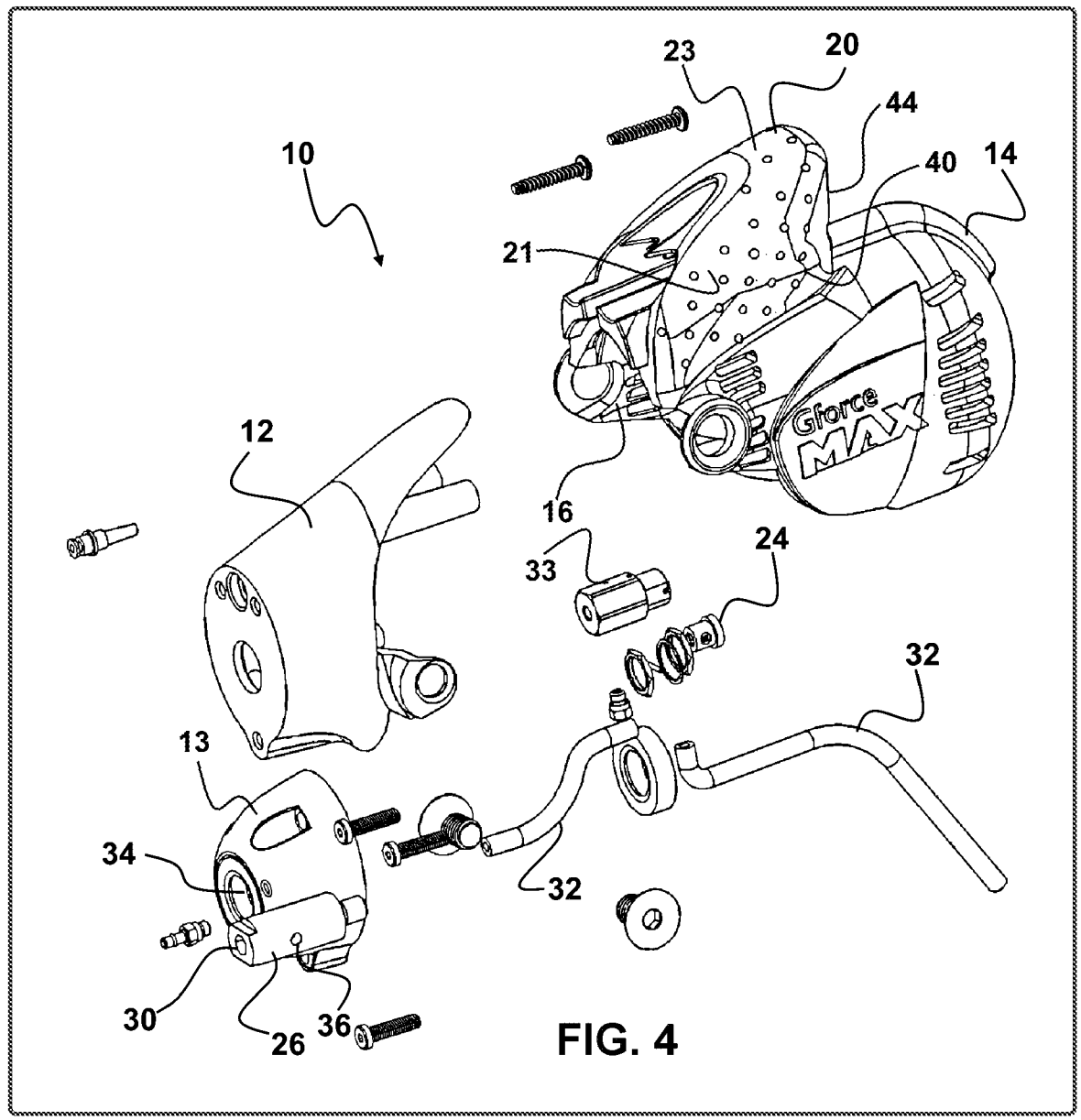
FIG. 4 shows the device herein as in FIG. 1 but without the hand held electric or pneumatic motor to which the interior surfaces of the first half and second half of the casing are complimentary in shape, and showing the user triggered fluid supply conduit delivering fluid to the hub engaging a polishing component.

Shown in FIG. 4 is an exploded view showing interior-positioned components of the device 10 as in FIG. 1, with the hand held electric or pneumatic drill motor 19 to which the casing 11 forming the assembled device 10 engages being removed, to better view the components of the fluid pathway formed by the components herein noted above. As can be seen, the components forming the fluid pathway employ the fluid conduit 32 to deliver fluid flow to the fluid aperture 30 in the distal end of the rotating connector 26 to then be communicated to the polishing pad 17 from the rotating connector 26 when the trigger 24 is actuated to allow such flow. The fluid flows under pressure into the fluid conduit 32 from a pressurized fluid supply such as tap water or another fluid or pressurized fluid supply. While the fluid from the second end of the fluid conduit adjacent the end cap 13 portion of the first half casing 12 could just exit to spray on and around the polishing pad 17, currently it is more preferred to achieve a more even flow to have the fluid flow into the fluid cavity 34 surrounding the rotation of a fluid opening 36 in the rotating connector 26, so it may flow through a channel in the rotating connector 26 to the fluid aperture 30 and to the polishing pad 17.

In FIG. 5 is depicted a rear view or end view of the second half casing 14 operatively engaged upon the exterior surface 18 of the housing of the hand held electric or pneumatic motor 19 employed herewith. As can be seen, the projecting portion 20 forms the secondary handle 21 extending from a second side of the casing 11, which is preferably substantially aligned with the plane of the handle 22 of the hand held electric motor 19, which projects from the first side of the casing 11.

Also shown is the exterior curved surface 38 of the secondary handle 21, intersects the second side of the formed cashing 11 at a first end or bottom of the secondary handle 21, where a pair of formed recesses 40 are formed. The recesses are formed in between the curved surface 38 of the secondary handle 21 and the second side of the housing 11 by the curving of the curved surface 38 toward the handle axis 35.

The curved exterior surface 38 of the secondary handle 21 having the recesses 40 at the intersection at a first end of the secondary handle with the casing 11, defines spaces to help with the ergonomic comfortable grip, with the palm of the hand adjacent one recess 40 and the distal ends of the fingers of the gripping hand of a user positionable within the opposing recess 40 on the opposite side of the secondary handle 21.

Such a configuration allows a comfortable and secure grip of either a right and or left hand of a user with the secondary handle 11. Further, it allows the user a much more secure grip on the secondary handle 21 to pull it in the direction of the top edge 23 during use, without the grip slipping since the fingers are wrapped around the widest diameter of the secondary handle 23 at a mid portion thereof.

While the exterior surface 38 of the secondary handle 21 could be formed without the two opposing recesses 40, with a linear intersection with the casing 11, the two recesses 40 on opposing sides was found to provide more room for the distal ends of the fingers of the user gripping the secondary handle 21, and a more secure and comfortable grip. The inward curve 42 forming the two recesses 40 extends from a widest diameter 37 of the secondary handle 21 to the intersection of the exterior surface 38 thereof with the second side of the engaged casing 11.

In FIG. 6 is shown an opposite side of the device 10 with the casing 11 configured operatively engaged with a drill motor 19 as noted herein. Additionally shown is a view of the preferred downward angle "D" of the top edge 23 of the secondary handle 21. As shown, a central area of the top edge 23 declines from a first end of the secondary handle 21 at a highest point above the drill motor axis 29 adjacent to the rear wall 44 surrounding the trigger 24, to a lowest point above the drill motor axis 29 at a second end of the secondary handle 21, where it is closest to the rotating connector 26.

Currently, an angle of the line 27 substantially followed by the handle and top edge 23 shown as "D" rises at an angle between 20-40 degrees from the lowest second end toward the highest first end, relative to the intersection of the angle line 27 of the secondary handle 21, with the drill motor axis 29 as shown in the enlarged angle depiction, is preferred. This is noted because it was found to allow the user to maintain their elbow of the gripping hand in a comfortable position, substantially level with or below, the polishing point on the glass, and making it easier for exerting ongoing pressure to the device 10 during use.

FIG. 7 and FIG. 8 show as a rear perspective view of the device 10 showing the projecting portion forming the secondary handle 21. As shown the curved exterior surface 38 of the projecting portion 20 forming the secondary handle 21 follows a downward angle "D" along a top edge 23 of the formed secondary handle 21 toward the drill motor axis 29 as in FIG. 6. The secondary handle 21 center axis 25 may substantially parallel the downward angle "D" of the top edge 23, to form an even diameter of the curved exterior surface 38 of the secondary handle 21, curved around the angle of the center axis 25 for to maximize the ergonomic grip area. Also shown is the trigger 24 conveniently located on the rear wall 44 of the projecting portion 20 forming the secondary handle 21. As noted, this trigger 24 is in a location where it may be actuated to start fluid flow by a thumb of the gripping hand of a user, without removing the gripping hand of the user from the holding the secondary handle 21 with wrapped fingers.

It should be noted that any of the different depicted and described configurations and components of the device 10 herein can be employed with any other configuration or component shown and described as part of the device herein. Additionally, while the present invention has been described herein with reference to particular embodiments thereof and/or steps in the method of production or use, a latitude of modifications, various changes and substitutions are intended in the foregoing disclosure, and it will be appreciated that in some instance, some features or configurations, of the invention could be employed without a corresponding use of other features without departing from the scope of the invention as set forth in the following claims. All such changes, alternations and modifications as would occur to those skilled in the art are considered to be within the scope of this invention as broadly defined in the appended claims.

What is claimed is:

1. A glass polishing apparatus comprising:
a casing having an interior surface and an exterior surface extending between a first side and an opposite second side of said casing;
said casing configured for an operative engagement to an exterior surface of a drill motor with a handle of said drill motor projecting from an opening positioned along said first side of said casing while in said operative engagement;
a rotating connector positioned at a front end of said casing and coupled to a powered shaft of said drill motor with said casing in said operative engagement;
said rotating connector having a mating connector thereon for engaging a connector of a tool;
a fluid pathway coupled with said casing, a first end of said fluid pathway configured for a connection to a pressurized fluid stream;
a second end of said fluid pathway exiting a fluid aperture located on a distal end of said rotating connector;
said fluid aperture removably engageable to a sealed connection with a channel running axially through said connector for said tool;
said stream of fluid running through said fluid aperture and said channel to said tool; and
whereby a work surface contacted with said tool engaged with said rotating connector, is bathed in said fluid stream exiting said second end of said fluid pathway.

2. The glass polishing apparatus of claim 1, additionally comprising:
said casing having a projecting portion extending from said second side thereof, said projecting portion defining a secondary handle;
said handle of said drill motor projecting from said opening positioned along said first side of said casing and said secondary handle projecting from said second side of said casing are located substantially in the same plane.

3. The glass polishing apparatus of claim 2, additionally comprising:
said secondary handle having a top edge running in between side portions thereof; and
said top edge running at an angle toward said front end of said casing, from a highest elevation of said top edge above said second side of said casing at said first end of said secondary handle, to a lowest elevation of said top edge above said second side of said casing at said second end of said secondary handle.

4. A glass polishing apparatus comprising:
a casing having an interior surface and an exterior surface extending between a first side and an opposite second side of said casing;
said casing configured for an operative engagement to an exterior surface of a drill motor with a handle of said drill motor projecting from an opening positioned along said first side of said casing while in said operative engagement;
a rotating connector positioned at a front end of said casing and coupled to a powered shaft of said drill motor with said casing in said operative engagement;
said rotating connector having a mating connector thereon for engaging a connector of a tool;
a fluid pathway coupled with said casing, a first end of said fluid pathway configured for a connection to a pressurized fluid stream;
a second end of said fluid pathway positioned at said front end of said casing for directing a stream of fluid therefrom into or adjacent to said tool, whereby a work surface contacted with said tool engaged with said rotating connector, is bathed in said fluid stream exiting said second end of said fluid pathway;
said casing having a projecting portion extending from said second side thereof, said projecting portion defining a secondary handle;
said secondary handle having a first end extending toward said front end of said casing from a second end of said secondary handle, said second end of the secondary handle forming a rear wall thereof;
said secondary handle having a curved exterior surface extending therearound adapted for gripping by the fingers of a user;
a valve positioned along said fluid pathway, said valve actuable to a first position blocking said fluid stream and to a second position allowing passage of said fluid stream therethrough; and
a valve trigger coupled to said valve and extending through said rear wall, whereby said valve is actuable between said first position and said second position by a thumb of said user while said fingers of said user are concurrently gripping said exterior surface of said secondary handle.

5. The glass polishing apparatus of claim 4, additionally comprising:
said second end of said fluid pathway exiting a fluid aperture located on a distal end of said rotating connector;
said fluid aperture removably engageable to a sealed connection with a channel running axially through said connector for said tool; and
said stream of fluid running through said fluid aperture and said channel to said tool.

6. The glass polishing apparatus of claim 5, additionally comprising:
said handle of said drill motor projecting from said opening positioned along said first side of said casing and said secondary handle projecting from said second side of said casing are located substantially in the same plane.

7. The glass polishing apparatus of claim 6, additionally comprising:
a first recess formed at an intersection of said curved exterior surface of said secondary handle with an exterior surface of said casing on a first side of said secondary handle; and
a second recess formed at an intersection of said curved exterior surface of said secondary handle with said exterior surface of said casing on a second side of said secondary handle.

8. The glass polishing apparatus of claim 7, additionally comprising:
said secondary handle having a top edge running in-between side portions thereof; and
said top edge running at an angle toward said front end of said casing, from a highest elevation of said top edge above said second side of said casing at said first end of said secondary handle, to a lowest elevation of said top edge above said second side of said casing at said second end of said secondary handle; and
said angle rising at an angle between 20-40 degrees from the lowest elevation toward the highest elevation relative to an intersection of the angle line running along said top edge with an axis running through said powered shaft of said drill motor with said casing in said operative engagement therewith.

9. The glass polishing apparatus of claim 5, additionally comprising:
a first recess formed at an intersection of said curved exterior surface of said secondary handle with an exterior surface of said casing on a first side of said secondary handle; and
a second recess formed at an intersection of said curved exterior surface of said secondary handle with said exterior surface of said casing on a second side of said secondary handle.

10. The glass polishing apparatus of claim 9, additionally comprising:
said secondary handle having a top edge running in between side portions thereof; and
said top edge running at an angle toward said front end of said casing, from a highest elevation of said top edge above said second side of said casing at said first end of said secondary handle, to a lowest elevation of said top edge above said second side of said casing at said second end of said secondary handle.

11. The glass polishing apparatus of claim 4, additionally comprising:
said handle of said drill motor projecting from said opening positioned along said first side of said casing and said secondary handle projecting from said second side of said casing are located substantially in the same plane.

12. The glass polishing apparatus of claim 11, additionally comprising:
a first recess formed at an intersection of said curved exterior surface of said secondary handle with an exterior surface of said casing on a first side of said secondary handle; and a second recess formed at an intersection of said curved exterior surface of said secondary handle with said exterior surface of said casing on a second side of said secondary handle.

13. The glass polishing apparatus of claim 12, additionally comprising:
said secondary handle having a top edge running in between side portions thereof; and
said top edge running at an angle toward said front end of said casing, from a highest elevation of said top edge above said second side of said casing at said first end of said secondary handle, to a lowest elevation of said top edge above said second side of said casing at said second end of said secondary handle.

14. The glass polishing apparatus of claim 13, additionally comprising:
said angle rising at an angle between 20-40 degrees from the lowest elevation toward the highest elevation relative to an intersection of the angle line running along said top edge with an axis running through said powered shaft of said drill motor with said casing in said operative engagement therewith.

15. The glass polishing apparatus of claim 4, additionally comprising:
a first recess formed at an intersection of said curved exterior surface of said secondary handle with an exterior surface of said casing on a first side of said secondary handle; and
a second recess formed at an intersection of said curved exterior surface of said secondary handle with said exterior surface of said casing on a second side of said secondary handle.

16. The glass polishing apparatus of claim 15, additionally comprising:
said secondary handle having a top edge running in between side portions thereof; and
said top edge running at an angle toward said front end of said casing, from a highest elevation of said top edge above said second side of said casing at said first end of said secondary handle, to a lowest elevation of said top edge above said second side of said casing at said second end of said secondary handle.

17. The glass polishing apparatus of claim 4, additionally comprising:
said secondary handle having a top edge running in between side portions thereof; and
said top edge running at an angle toward said front end of said casing, from a highest elevation of said top edge above said second side of said casing at said first end of said secondary handle, to a lowest elevation of said top edge above said second side of said casing at said second end of said secondary handle.

* * * * *